April 28, 1925.
A. G. RONNING ET AL
TRACTOR CULTIVATOR
Original Filed March 6, 1916   3 Sheets-Sheet 2
1,535,439
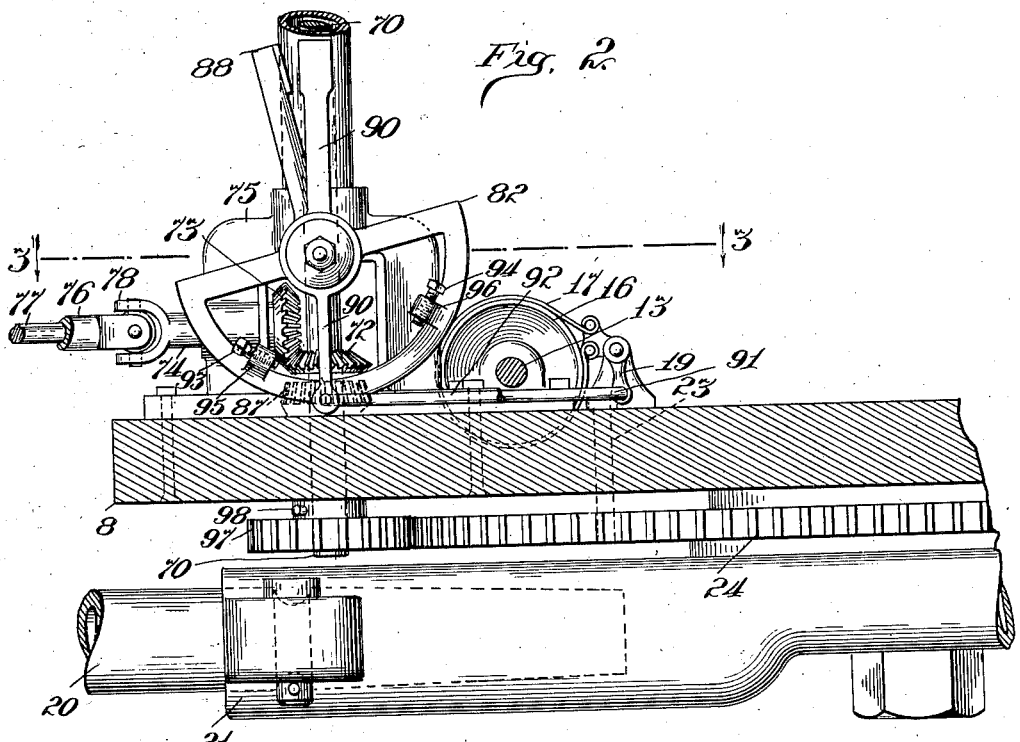
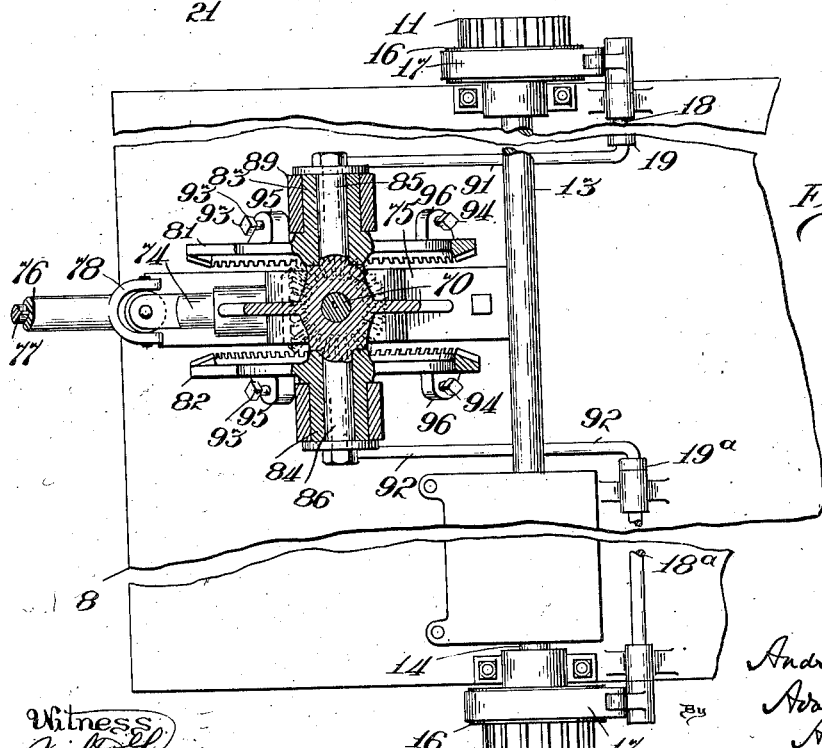
Inventors.
Andrew G. Ronning,
Adolph Ronning.
Adams Jackson
Attorneys.
Witness
Milton Lenoir

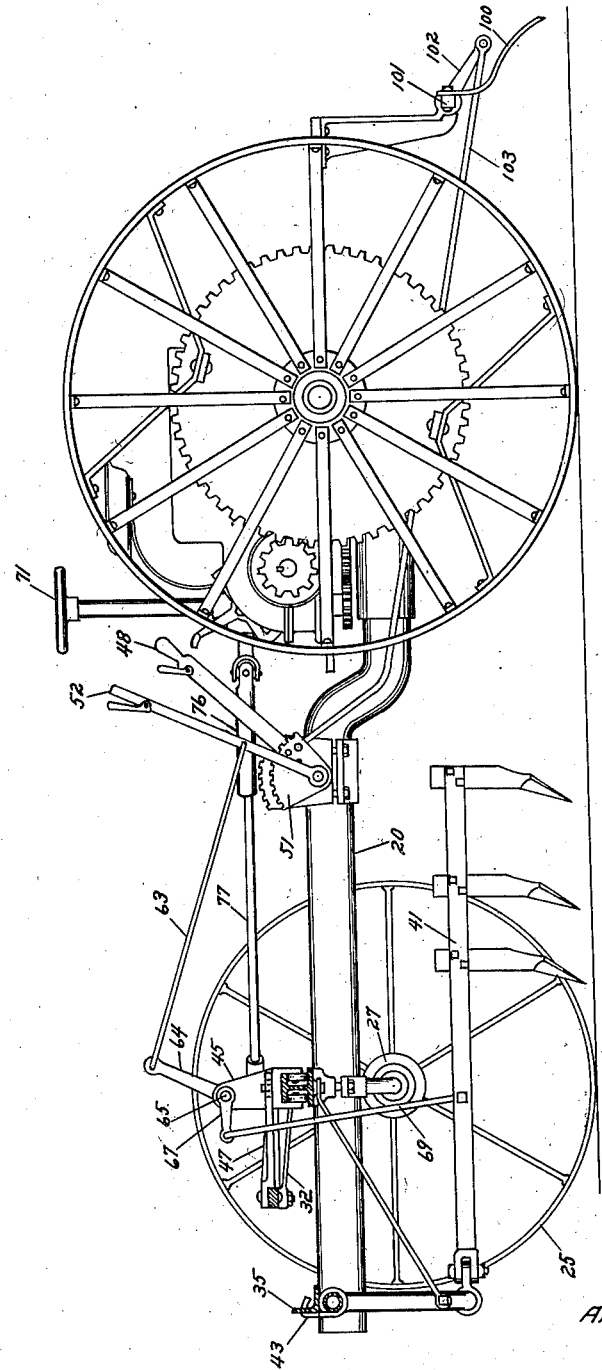

Patented Apr. 28, 1925.

1,535,439

UNITED STATES PATENT OFFICE.

ANDREAN G. RONNING AND ADOLPH RONNING, OF MINNEAPOLIS, MINNESOTA.

TRACTOR CULTIVATOR.

REISSUED

Original application filed March 6, 1916, Serial No. 82,516. Divided and this application filed June 21, 1918. Serial No. 241,133.

*To all whom it may concern:*

Be it known that we, ANDREAN G. RONNING and ADOLPH RONNING, citizens of the United States, and residents of Minneapolis, in the county of Hennepin and State of Minnesota, have invented certain new and useful Improvements in Tractor Cultivators, of which the following is a specification, reference being had to the accompanying drawings.

Our invention relates to farm implements and particularly to cultivators, and has for its principal object to provide a new and improved tractor propelled cultivator wherein the operator will have a clear and unobstructed view of the corn rows so that he may properly manipulate the cultivator rigs, and which will be so constructed and arranged that the machine, including the cultivator rigs, may be accurately guided as it moves along the rows. Another object is to provide improved means for steering a tractor pushed farm implement to facilitate turning the machine at the ends of the field, or wherever else it may be necessary to turn it. A further object is to provide means for loosening the soil behind the traction wheels. We accomplish these objects as illustrated in the drawings, and as hereinafter described. What we regard as new is set forth in the claims.

This is a divisional application of an original application filed March 6th, 1916, Serial No. 82.516, resulting in Letters Patent #1,340,461, issued May 8th, 1920.

In the accompanying drawings:—

Fig. 2 is an enlarged partial longitudinal sectional view on line 2—2 of Fig. 1; and Fig. 3 is a partial horizontal section on line 3—3 of Fig. 2.

Fig. 4 is a partly sectional elevation, as seen on the line 4—4 in Fig. 1.

Figure 1:
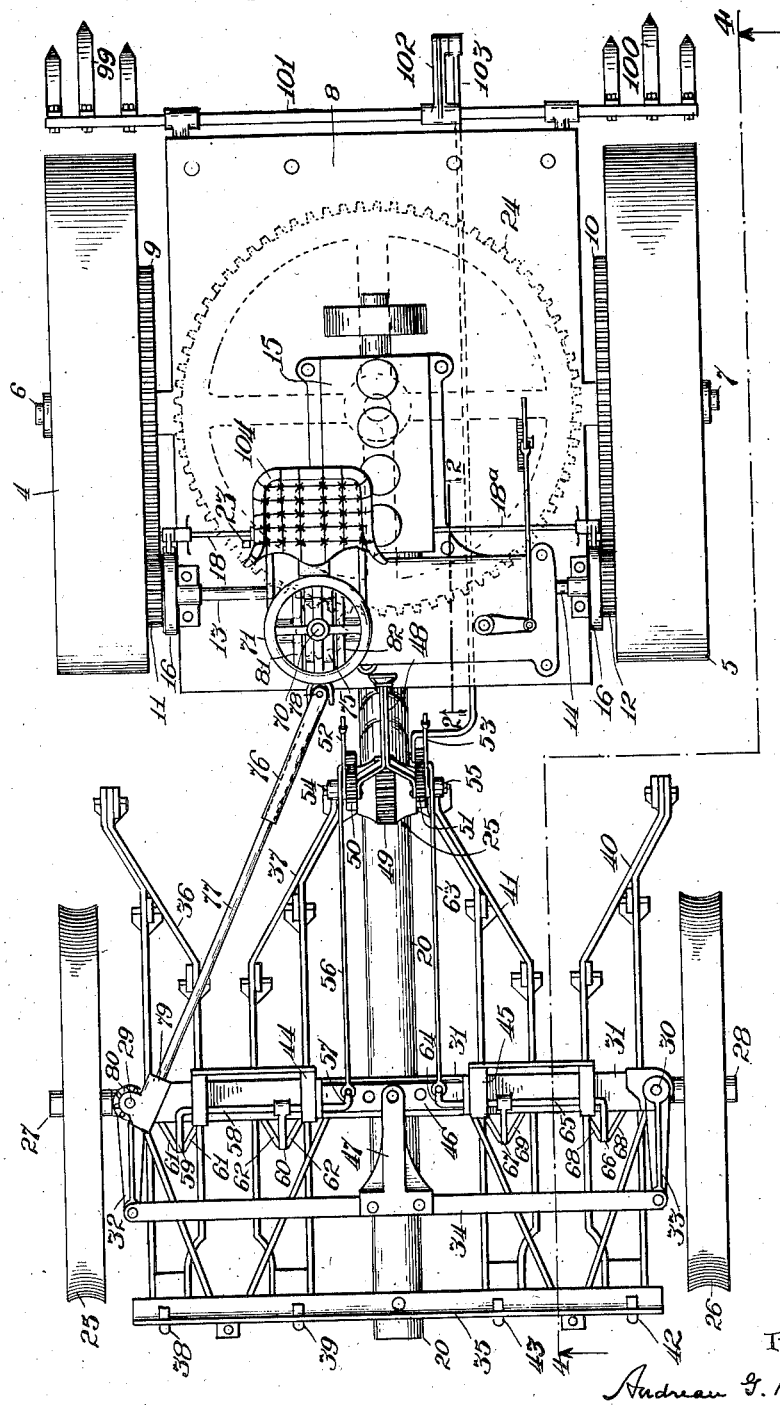
Fig. 1 is a plan view of our improved implement.

Our improved machine comprises a tractor element by which the machine is propelled, and a cultivating element arranged in advance of and pushed by the tractor element and comprising a front frame having dirigible front wheels, and earth working tools disposed ahead of the tractor element and pulled by said front frame, which is operatively connected with the tractor element so that the machine may be guided in traversing the field, and steered in turning, etc., by an operator seated on the tractor element. Provision is also made by which the operator may suitably manipulate the cultivating devices, and for automatically shifting them laterally when the front wheels are turned in either direction. To facilitate turning at the ends of rows and elsewhere, the traction wheels may also be turned laterally in relation to the front frame in conjunction with the steering of the front wheels.

Referring to the drawings: 4—5 indicate traction wheels which are mounted on suitable spindles 6—7 at opposite sides of an intermediate platform 8, as shown in Fig. 1. The traction wheels 4—5 are provided with gears 9—10, respectively, at their inner sides, with which mesh driving pinions 11—12, carried by alined shafts 13—14, which are connected by any suitable differential gearing, and are driven in any approved way from a motor 15, such as an internal combustion engine, mounted on the platform 8. The differential shafts 13—14 are also provided with brake drums 16, upon which are mounted brake bands 17, as best shown in Figs. 2 and 3. Said brake bands are arranged to be operated to grip or release their respective drums by means of rock shafts 18—18ª, mounted at opposite sides of the platform 8 and having downwardly extending arms 19—19ª, by which said shafts may be rocked by mechanism which will be hereinafter more fully described. The arrangement is such that either of the driving pinions 11—12 may be separately braked to stop the traction wheel driven by it and thereby steer the machine by means of the traction wheels.

20 indicates a reach pole or tongue, the rear end of which is detachably fitted in a suitable socket in a tubular support 21, which is mounted underneath the platform 8 upon a central pivot 22. The support 21 may in certain circumstances be held against rotation about its pivot by means of a bolt 23 which is adapted to extend through the platform 8 and engage a ring gear 24 secured to the support 21, as shown in Fig. 2. The tongue 20 extends forward along the center line of the machine, and is rigidly secured to a front frame to which are connected the cultivator rigs and the dirigible front wheels as hereinafter described, so that the tongue forms a part of the frame of the machine as a whole.

25—26 indicate the front wheels which, as shown in Fig. 1, are mounted upon spindles 27—28, which project laterally from vertical pivots 29—30, mounted in suitable bearings at the ends of the front axle 31. Said pivots are provided with forwardly extending bars 32—33, the front ends of which are connected by a cross bar 34 which holds the arms 32—33, and therefore the front wheels, in parallelism with each other. Obviously, by turning one of the pivots, as 29, both front wheels may be turned in one direction or the other to guide the machine.

35 indicates a transverse bar fixedly secured to the forward portion of the tongue 20, as shown in Fig. 1. 36—37 indicate a pair of cultivator rigs arranged at one side of the machine, their forward ends being pivotally connected to the transverse bar 35 by depending links 38—39. 40—41 indicate a second pair of cultivator rigs which are arranged at the opposite side of the machine, and are in like manner connected with the transverse bar 35 by depending links 42—43. 44 indicates a casting mounted on the axle 31 at one side of the machine, and movable longitudinally thereon. Said casting is connected with the rigs 36—37 in any suitable way to cause said rigs to shift laterally in one direction or the other when the casting 44 is moved longitudinally on the axle. 45 indicates a similar casting mounted on the axle 31 at the opposite side of the machine and connected with the rigs 40—41 in a similar manner. 46 indicates a connecting bar which connects the castings 44—45 together so that they move in unison. 47 indicates an arm fixedly connected with the cross bar 34, and connected with the connecting bar 46, as shown in Fig. 1, so that the castings 44—45 move transversely of the machine in unison with the cross bar 34. Thus, when the front wheels 25—26 are turned in steering the machine, the castings 44—45 are shifted longitudinally upon the axle 31 in a corresponding direction, thereby laterally shifting the cultivator rigs in the same direction.

48 indicates a bifurcated lever mounted upon the tongue 20 in front of the platform 8 so as to swing back and forth. Said lever is provided with a suitable latch of any approved type, adapted to engage a fixed rack 49 carried by the tongue for locking the lever 48 in its different positions of adjustment. 50—51 indicate racks secured to the members of the lever 48 at opposite sides of the tongue so as to rock with said lever. 52—53 indicate auxiliary levers mounted on pivots 54—55 adjacent to the racks 50—51, said levers having suitable latches arranged to lock the levers 52—53 in their different positions of adjustment, and serving at the same time to lock them in fixed relation to the lever 48. It will be evident, that by this construction the levers 52—53 may be operated independently of the lever 48, but that when said levers are locked to their respective racks, they may be operated in unison by operating the lever 48.

56 indicates a connecting rod extending from the lever 52 to an arm 57 carried by a rock shaft 58 mounted on the casting 44, as shown in Fig. 1. Said rock shaft is provided with arms 59—60 connected respectively with the rigs 36—37 by links 61—62. Thus by operating the lever 52, the rock shaft 58 may be rocked to raise or lower the rigs 36—37. 63 indicates a connecting rod similar to the rod 56, which connects the lever 53 with an arm 64 carried by a rock shaft 65 mounted on the casting 45. Said rock shaft is provided with arms 66—67 connected by rods 68—69 with the rigs 40—41, so that by operating the lever 53, the rigs 40—41 may be raised or lowered. Thus the driver may vertically adjust the rigs at either side of the machine independently of those at the other side by operating the appropriate lever 52 or 53, or may simultaneously raise or lower all the rigs by operating the lever 48. The levers 52—53 are ordinarily used to regulate the depth of cultivation, and the lever 48 to lift all the rigs out of operative position.

70 indicates a steering shaft mounted in a vertical position at the forward portion of the platform 8 in advance of the engine 15, as shown in Fig. 1. Said shaft is provided with a steering wheel 71 at its upper end so that it may readily be turned, and carries a bevelled gear 72, which meshes with a bevelled gear 73, mounted upon a horizontal shaft 74. Preferably the shafts 70 and 74 are both mounted in a suitable casting 75 secured upon the platform 8, as shown in Fig. 2. 76—77 indicate the members of an extensible steering rod, by which the shaft 74 is operatively connected with the dirigible front wheels, said rod members being telescopically fitted together, as shown in Fig. 1. The member 76 is connected with the shaft 74 by a universal coupling 78, and the member 77 is provided at its forward end with a worm 79, which engages a worm wheel 80, secured upon the pivot 29 of dirigible wheel 25. Thus, by rotating the steering wheel 71, the steering rod members may be rotated, thereby rotating the worm 79 and the worm wheel 80, and turning the front wheels in one direction or the other to guide the machine. The telescopic construction of the members 76—77 permits the length of the steering rod to be varied, and also provides for readily disconnecting said members when the cultivator element is removed from the tractor element.

81—82 indicate segmental racks having hubs 83—84, which are mounted on pivots 85—86 projecting from opposite sides of the casting 75, as shown in Fig. 3. Said racks mesh with opposite sides of a bevelled gear 87, mounted on the shaft 70 below the gear 72, as shown in Fig. 2. Each of said racks is provided with an upwardly extending foot lever 88, as best shown in Fig. 2, so that, by pressing on one or the other of said foot levers, the rack with which it is connected may be rocked about its pivot, thereby rotating the gear 87, and through it rotating the shaft 70 and gear 72 to steer the front wheels. It will be evident, therefore, that the operator may steer the machine either by turning the steering wheel 71 by hand, or by operating one or the other of the levers 87.

In conjunction with the steering of the machine effected by turning the front wheels, as described, provision is made for automatically braking one or the other of the traction wheels at the same time, to aid in the steering operation. For this purpose levers 89—90 are provided at opposite sides of the segmental racks 81—82, said levers being pivoted between their ends upon the hubs 83—84, as shown in Fig. 3, and their lower ends being connected with the arms 19—19ª of the rock shafts 18—18ª at opposite sides of the machine by connecting rods 91—92, respectively, as shown in Fig. 3. The arrangement is such that forward movement of the upper end of either of the levers 89—90 will apply the brake to the driving gear 11 or 12 at the opposite side of the machine, thereby retarding or stopping the traction wheel driven by such driving gear. This brake operated steering mechanism is not ordinarily used in guiding the machine along the corn rows, but is intended for use in making short turns, as at the ends of the field, and, therefore, it is arranged to be operated automatically only when the front wheels are turned sharply. For that purpose the segmental racks 81—82 are each provided with a pair of set screws 93—94, mounted in bosses 95—96 on the outer faces of said racks and at opposite sides of the lower ends of the levers 89—90, as shown in Fig. 2. The arrangement is such that by rocking the racks 81—82, one or the other of the set screws 93—94 may be caused to engage the lower end of the levers 89—90, which lie between them, and thereby move said levers to set or release the brakes connected with them. The set screws 93—94 of each rack are set a sufficient distance apart so that the rack to which they appertain has a considerable range of movement without bringing said set screws into engagement with the lever lying between them, and one or the other set screw 94 is arranged to engage and operate the appropriate lever to set the brake connected with it only when the front wheels are turned to a sharp angle. The set screws 93 operate to release the brake that may have been set after the front wheels have been straightened up. Either or both of the brakes may, however, be set by hand independently of the operation of the front wheel steering devices by pulling back the upper ends of one or both of the levers 89—90.

Provision is also made for turning the traction wheels laterally with reference to the front frame in conjunction with the steering of the front wheels, to aid in guiding the machine. For this purpose the steering shaft 70 is provided at its lower end with a pinion 97 which meshes with the gear 24, as shown in Fig. 2. By this construction when the steering wheel 71 is operated to turn the front wheels, for example to the left, the platform 8 and the traction wheels will be swung to the right about the pivot 22, i. e. in a clock-wise direction as viewed in Fig. 1, thereby enabling the machine to make a short turn toward the left without turning the front wheels so sharply as to apply the brakes. If desired the platform 8 may be non-rotatably secured to the tongue 20 by passing the pin 23 through the platform into engagement with a suitable socket in the gear 24, as indicated by dotted lines in Fig. 2, and by then disconnecting the pinion 97 from the shaft 70 by withdrawing the pin 98 shown in Fig. 2, the front wheels may be steered independently of the traction wheels. The pinion 97 then remains loose on said shaft, resting on the support 21.

The machine illustrated and described is a two-row machine, the tongue 20 overlying the space between two rows, while the wheels travel outside of said rows. In order to loosen the soil along the rows traversed by the traction and front wheels, which is apt to be pressed down considerably by the weight of the machine, we provide two sets of spring teeth 99—100, disposed back of the traction wheels 4—5, respectively, and carried by a rock shaft 101, mounted in suitable bearings at the rear of the platform 8. Said rock shaft is provided with an arm 102, which is connected by connecting rod 103 to the lever 48 in such manner that when said lever is operated to lower the cultivator rigs into operative position, the spring teeth 99—100 can also be lowered into operative position, and vice versa. Thus, when the cultivator is in operation, said spring teeth will loosen the soil back of the traction wheels, and when the cultivator rigs are raised, as in turning around or moving the machine from one field to another, the spring teeth will be held up out of operative position. 104 indicates the driver's seat which is suitably mounted on the platform 8 in a convenient position back of the steering wheel 71, as shown in Fig. 1.

A salient characteristic of our improved cultivator is that it comprises a power-operated pushing member located behind the earth working tools in connection with means pushed by said pushing member and operating to pull the tools and also to guide the cultivator. By this construction the operator who sits back of the tools and at the front of the pushing member has a clear and unobstructed view of the corn rows and also of the cultivator shovels, and consequently may accurately follow the rows and dodge plants which are more or less out of line. The arrangement of the cultivator rigs between the dirigible front wheels and their pivotal connection with the front frame in advance of the axes of said wheels, together with the provision of means for shifting the rigs laterally when the wheels are turned in steering the implement, also conduce to accurate operation of the cultivator by the operator since the cultivator shovels are brought forward so that they engage the soil on transverse lines substantially in the transverse vertical planes of the front wheels, and, therefore, when it is necessary to dodge a plant the shovels are shifted laterally coincidently with the turning of the steering wheels instead of afterwards. The time when and the extent to which the shovels are shifted is, therefore, under the accurate control of the operator, and accordingly the work of cultivating may be more efficiently performed.

What we claim as our invention, and desire to secure by Letters Patent, is:—

1. In a cultivator, the combination of earth working tools, a power operated pushing member located behind said tools, means pushed by said pushing member and operating to pull said tools, means for steering the cultivator, and means operated by said steering means for moving the tools laterally in a direction corresponding with that in which the cultivator is directed.

2. In a tillage implement, the combination of a frame, traction means at the rear of said frame, power means on the frame connected to the traction means, steering means at the front of the frame, gangs of earth working tools adapted to be shifted transveresly in either direction through the soil and supported by the front portion of the frame, and means for steering said wheels and simultaneously moving said gangs transversely of said frame.

3. In a cultivator, the combination of a frame, steering wheels at the front of the frame, a tractor element at the rear of the frame, soil working tools connected with the front portion of the frame and arranged to engage the soil on transverse lines in the transverse vertical planes of the steering wheels, a motor on the frame, means for transmitting power from the motor to the tractor element, means for steering the steering wheels, and means operated by the turning of the steering wheels laterally in either direction for shifting the soil working tools laterally in the corresponding direction.

4. In a cultivator, the combination of a frame, steering wheels at the front of the frame, a tractor element at the rear of the frame, laterally-adjustable tool carriers connected with said frame in front of the axes of the steering wheels, earth working tools carried by said tool carriers and arranged to engage the earth on transverse lines in the transverse vertical planes of the steering wheels, means for adjusting the steering wheels, and means for adjusting the tools simultaneously with the adjustment of the steering wheels.

5. In a cultivator, the combination of a frame, steering wheels at the front of the frame, a tractor element at the rear of the frame, laterally-adjustable tool carriers connected with said frame in front of the axes of the steering wheels, earth working tools carried by said tool carriers and arranged to engage the earth on transverse lines in the transverse vertical planes of the steering wheels, a driver's support between the tractor element and the earth working tools, means for adjusting the steering wheels, and means for adjusting the tools simultaneously with the adjustment of the steering wheels.

6. An agricultural implement comprising a motor driven tractor element, cultivating devices disposed in advance thereof and adapted to be propelled thereby from the rear, dirigible front wheels at opposite sides of the cultivating devices, and means connecting said cultivating devices with said wheels in advance of the axes thereof.

7. An agricultural implement comprising a motor driven tractor element, cultivating devices disposed in advance thereof and adapted to be propelled thereby from the rear, dirigible front wheels, means connecting said cultivating devices with said wheels, and means operated by the steering of said wheels for moving said cultivating devices laterally in conjunction with the turning of said wheels in steering the implement.

8. An agricultural implement comprising a motor driven tractor element, cultivating devices disposed in advance thereof and adapted to be propelled thereby from the rear, dirigible front wheels, means connecting said cultivating devices with said wheels in advance of the axes thereof, and means operated by the steering of said wheels for moving the cultivating devices laterally in conjunction with the turning of said wheels in steering the implement.

9. An agricultural implement comprising a frame, a motor driven tractor element at the rear of the implement, dirigible means supporting the forward portion of said frame whereby the implement is adapted to be propelled from the rear and may be guided when in operation, and cultivating means at the forward portion of said frame between said wheels and connected therewith in advance of the axes about which the dirigible means turn in steering the implement.

10. An agricultural implement adapted to be propelled from the rear, comprising a motor driven tractor element, a front frame pivotally connected therewith to swing laterally, cultivating devices disposed in advance of said tractor element, and connected with said frame and dirigible means connected with said front frame at opposite sides of said cultivating devices.

11. An agricultural implement adapted to be propelled from the rear, comprising a motor driven tractor element, a front frame pivotally connected therewith to swing laterally, dirigible means connected with said front frame, and cultivating devices between said dirigible means and connected with said front frame in advance of the axes about which the dirigible means turn in steering the implement.

12. An agricultural implement comprising a front frame adapted to be propelled from the rear, dirigible means and cultivating devices connected with said front frame, a motor driven tractor element back of said cultivating devices and connected with said front frame, means for steering said dirigible means, and means for turning said tractor element laterally with relation to said front frame to aid in steering the implement.

13. An agricultural implement comprising a front frame adapted to be propelled from the rear, dirigible means and cultivating devices connected with said front frame, a power-propelled tractor back of said cultivating devices, means for steering said dirigible means, and means for turning said tractor laterally to aid in steering the implement.

14. An agricultural implement comprising a front frame adapted to be propelled from the rear, dirigible means and cultivating devices connected with said front frame, a power-propelled tractor back of and connected with said front frame, and means adapted to be operated to steer said dirigible means and to simultaneously turn said power-propelled tractor laterally.

15. An agricultural implement comprising a front frame adapted to be propelled from the rear, dirigible means supporting the front frame, a motor driven tractor element pivotally connected with said front frame whereby it may turn laterally at an angle thereto, cultivating means between said dirigible means and connected with said front frame in advance of the axes about which said dirigible means turn in steering the implement, and means for moving said cultivating devices laterally to one side or the other when said dirigible means are turned in steering the implement.

16. An agricultural implement comprising a member having traction wheels, power operated differential mechanism for driving said wheels, brakes for said wheels, a frame connected with said member, dirigible front wheels connected with said frame, means for steering said dirigible wheels, cultivating devices in advance of said traction wheels and connected with said frame, and means cooperating with said steering means for braking one or the other of said traction wheels.

17. An agricultural implement comprising a member having traction wheels, power operated differential mechanism for driving said wheels, separately operable brakes for said wheels, a frame connected with said member, dirigible front wheels connected with said frame, cultivating devices between said front wheels and connected with said frame, and means for steering said dirigible wheels.

18. An agricultural implement adapted to be propelled from the rear, comprising a member having traction wheels, power operated differential mechanism for driving said wheels, brakes for said wheels, a frame connected with said member, dirigible front wheels connected with said frame, means for steering said dirigible wheels, cultivating devices connected with said frame in advance of the axes of said dirigible wheels, and means cooperating with said steering means for braking one or the other of said traction wheels.

19. An agricultural implement adapted to be propelled from the rear comprising a member having traction wheels, power operated differential mechanism for driving said wheels, separately operable brakes for said wheels, a frame connected with said member, dirigible front wheels connected with said frame, cultivating devices between said front wheels and connected with said frame in advance of said front wheels, and means for steering said front wheels.

20. An agricultural implement comprising a member having traction wheels, power operated differential mechanism for driving said wheels, brakes for said wheels, a front frame connected with said member, dirigible front wheels connected with said front frame, means for steering said front wheels and simultaneously turning said traction wheels angularly with respect to said front frame, cultivating devices connected with said front frame, and means cooperating with said steering means for braking one or the other of said traction wheels.

21. An agricultural implement adapted to be propelled from the rear comprising a member having traction wheels, a front frame connected therewith, dirigible wheels connected with said front frame, cultivating devices pivotally connected with said frame, lifting mechanism for said cultivating devices, means arranged back of said traction wheels for loosening the soil behind the same, and means operated by said lifting mechanism for lifting said soil loosening means out of operative position.

22. In a cultivator, the combination of the frame, traction means at the rear end of the frame, the two steering wheels at the front end, means connected to the steering wheels for transmitting power thereto to turn them, the soil working tools arranged to engage the soil on transverse lines in the transverse planes of the steering wheels, carriers for the tools laterally and bodily movable on and relatively to the frame, devices for connecting said carriers to the steering wheels, the engine on the frame, and the power transmitter interposed between the engine and the traction means whereby all the tools are uniformly movable transversely with the steering wheels and relatively to the frame.

23. In a cultivator, the combination of the frame, the steering wheels at the front end of the frame, the traction means at the rear end, the engine on the frame connected to the traction means, the soil working tools on the frame and arranged on transverse lines in the transverse vertical planes of the steering wheels, the series of tool carriers laterally and bodily adjustable on the frame, means connecting the tool carriers with the steering wheels, and manual devices for adjusting the tool carriers.

24. In a cultivator, the combination of the frame, the traction means at the rear end of the frame, the steering wheels at the front end thereof, the engine on the frame, connected to the traction means, the bodily and laterally adjustable tool carriers, the tools adjustable with and also relatively to the carriers and all positioned to engage the earth on lines in the transverse vertical planes of the steering wheels, means for manually adjusting the steering wheels, means for manually adjusting the tools, and devices for optionally connecting together the two said adjusting means.

25. In a cultivator, the combination of the frame, the traction means at the rear end of the frame, the engine on the frame connected to the traction means, the steering wheels at the front end of the fame, the tools positioned to engage the earth on lines in the transverse vertical planes of the steering wheels, and manually operable means for adjusting the steering wheels and the tools independently or simultaneously at option.

26. In a cultivator, the combination of the frame, the transversely aligned steering wheels near the front end of the frame, the laterally adjustable tool carriers, the support on the frame for said carriers arranged in front of the axes of the steering wheels, the tools supported by the carriers and arranged to engage the earth at lines on the transverse planes of the steering wheels, the traction means at the rear end of the frame, the drivers support between the traction means and the tool gangs, means for bodily adjusting the tool gangs laterally, means for adjusting the steering wheels, and means for actuating the steering wheels simultaneously with the movements of the tool gangs.

27. In an earth working or tillage implement, the combination of a frame, traction means at the rear end of the frame, power means on the frame connected to the traction means, steering wheels at the front end of the frame, gangs of earth working tools adapted to be shifted manually transversely in either direction through the surface parts of the earth and supported by the front end part of the frame, and means for steering said wheels and simultaneously moving said gangs transversely of said frame.

28. In a machine of the character described, the combination of a power unit having laterally arranged traction wheels, a frame arranged forwardly of the traction unit to be pushed thereby, primary earth working tools connected with said frame to engage the ground area spanned by said traction wheels, secondary earth working tools arranged to engage the earth traversed by the respective traction wheels, and means for simultaneously raising and lowering the primary and secondary earth working tools.

29. In a machine of the character described, the combination of a power unit having laterally arranged traction wheels, a frame arranged forwardly of the traction unit to be pushed thereby, primary earth working tools connected with said frame to engage the ground forwardly of the power unit, secondary earth working tools arranged rearwardly of the traction wheels, a lifting mechanism, and means operated by said lifting mechanism for lifting all of the earth working tools out of operative position.

30. An agricultural implement adapted to be propelled from the rear comprising a power unit having traction wheels, a front frame arranged forwardly of the power unit to be pushed thereby, gangs of primary earth working tools connected with said frame, secondary earth working tools arranged back of said traction wheels, devices for respectively adjusting said gangs, means for collectively lifting said gangs out of operative engagement with the earth, and means operative by said lifting means for raising said secondary earth working tools.

31. A machine of the character described comprising a power unit having laterally arranged traction wheels, a front frame adapted to be pushed by said power unit, dirigible means and cultivating devices connected with said frame, a steering device, means operative upon an initial movement of the steering device for actuating the dirigible means, and means operative upon a secondary movement of the steering device for braking one of the traction wheels.

32. A machine of the character described comprising a power unit having laterally arranged traction wheels, a suitably supported frame arranged forwardly of the power unit to be pushed thereby, earth engaging devices connected with said frame, a steering device, means operative by an initial movement of the steering device for changing the direction of the frame, and means operative by a secondary movement of the steering device to brake one of the traction wheels.

33. A machine of the character described comprising a power unit having laterally arranged traction wheels, a frame pivotally connected to the power unit forwardly thereof, dirigible wheels and earth engaging devices connected with said frame, a device for steering the machine, means operative upon an initial movement of the steering device for turning said frame and dirigible wheels with respect to the power unit, and means operative by a secondary movement of the steering device for braking one of the traction wheels.

34. A power propelled tillage implement having in combination a front frame, one or more dirigible wheels supporting said frame, a plurality of gangs of cultivating devices connected with the said frame and adapted to be swung laterally, a second frame adjustably connected to the rear of the cultivator frame, means for angularly adjusting said frames for steering the implement, power driven frame-pushing devices mounted on the second frame and engaging with the ground at a transverse line in the rear of the said dirigible wheels and of the cultivating devices, and means connecting the dirigible wheels and the gangs, whereby, when the gangs are being pushed from the rear and are being shifted laterally the dirigible wheels are simultaneously steered.

35. In an apparatus of the class described, the combination of a front frame, dirigible wheels supporting said frame, a plurality of gangs of cultivating devices carried by the said frame and adapted to be swung laterally relatively to the frame, a second frame connected to the rear of the cultivator frame and adapted to be adjusted angularly in relation thereto, means for so adjusting said frame to steer the apparatus, power-driven frame-pushing devices mounted on the second frame and engaging with the ground on a transverse line in the rear of the dirigible wheels and of the cultivating devices, an initial power receiving device for shifting the gangs laterally and connected to the dirigible wheels for simultaneously steering said wheels while the gangs and wheels are being pushed from the rear.

36. In an apparatus of the class described, the combination of a front frame, dirigible wheels supporting said frame, means for optionally turning said wheels for steering, a plurality of gangs of cultivating devices on the said frame adapted to be swung laterally relatively thereto, a second frame, means for connecting the second frame to the rear of the cultivator frame and adapted to steer the second frame independently of the steering action of the aforesaid dirigible wheels, power-driven, frame pushing devices mounted on the second frame and engaging with the ground at a transverse line in the rear of the dirigible wheels, and means connecting the gangs to the dirigible wheels whereby, when the cultivating devices are being pushed from the rear and simultaneously shifted laterally, the dirigible wheels are also simultaneously steered.

37. An apparatus of the class described, having in combination a cultivator, dirigible wheels supporting the cultivator, gangs of cultivating devices adapted to be swung laterally in unison around vertical axes, a second frame pivotally connected to the rear of the cultivator, means for controlling the pivotal relation of the frames, power-driven frame-pushing devices mounted on the second frame and engaging with the ground at a transverse line in the rear of the said dirigible wheels, means for shifting the gangs laterally and simultaneously turning the dirigible wheels and supplemental means for optionally steering the second frame and the power-driven ground engaging devices.

38. In a cultivating mechanism of the class described, the combination of a frame, dirigible wheels connected to and supporting the frame, tool gangs connected to the frame and adapted to swing laterally in relation thereto around vertical hinges, power devices for propelling said frame, gangs and wheels, and means connecting the tool gangs and the wheels for swinging the gangs laterally and simultaneously swinging the wheels and means for steering said mechanism independently of said gangs.

ANDREAN G. RONNING.
ADOLPH RONNING.